United States Patent
Yoon et al.

(10) Patent No.: US 8,773,349 B2
(45) Date of Patent: Jul. 8, 2014

(54) BACKLIGHT DRIVING CIRCUIT AND DISPLAY APPARATUS

(75) Inventors: Joo-han Yoon, Cheongju-si (KR); Young-gi Ryu, Cheongju-si (KR)

(73) Assignee: Magnachip Semiconductor, Ltd., Cheongju-si (KR)

( * ) Notice: Subject to any disclaimer, the term of this patent is extended or adjusted under 35 U.S.C. 154(b) by 286 days.

(21) Appl. No.: 13/349,819

(22) Filed: Jan. 13, 2012

(65) Prior Publication Data

US 2012/0182328 A1 Jul. 19, 2012

(30) Foreign Application Priority Data

Jan. 14, 2011 (KR) ........................ 10-2011-0003913

(51) Int. Cl.
*G09G 3/36* (2006.01)
*G09G 5/10* (2006.01)
*H05B 33/08* (2006.01)

(52) U.S. Cl.
CPC .............. *G09G 5/10* (2013.01); *H05B 33/0851* (2013.01)
USPC ............ 345/102; 345/690; 345/211; 345/204

(58) Field of Classification Search
CPC .................... G09G 2330/021; G09G 2330/08; G09G 2330/12; G09G 2330/02; G09G 5/10; H05B 33/0869; H05B 33/083; H05B 33/0818; H05B 33/086; H03K 17/102; H03K 17/6875; G06F 3/041
USPC .......... 345/690, 102, 173, 211, 204; 315/157, 315/127; 363/21.07
See application file for complete search history.

(56) References Cited

U.S. PATENT DOCUMENTS

| | | | |
|---|---|---|---|
| 5,892,647 A | 4/1999 | Mizoe | |
| 8,324,818 B2* | 12/2012 | Kunimori et al. | 315/157 |
| 2004/0080961 A1* | 4/2004 | Kim et al. | 363/21.07 |
| 2010/0177127 A1* | 7/2010 | Akiyama et al. | 345/690 |
| 2010/0295876 A1* | 11/2010 | Shin et al. | 345/690 |
| 2011/0181625 A1* | 7/2011 | Shin et al. | 345/690 |
| 2012/0119653 A1* | 5/2012 | Bianco et al. | 315/127 |
| 2013/0120234 A1* | 5/2013 | Atkins | 345/102 |
| 2013/0293596 A1* | 11/2013 | Atkins | 345/690 |

* cited by examiner

*Primary Examiner* — Thuy Pardo
(74) *Attorney, Agent, or Firm* — NSIP Law (57) ABSTRACT

A backlight driving circuit that provides backlight to a display panel of a display apparatus includes a power supply unit configured to supply power, a converter configured to convert and output a voltage of the supplied power, a light-emitting module supplied with the outputted voltage from the converter and providing the backlight, a switch connected to an output terminal of the light-emitting module and controlling an operation of the light-emitting module, a feedback resistor connected to an output terminal of the switch and sensing a voltage of a current flowing in the light-emitting module, a short-circuit sensing resistor connected between a ground of the power supply unit and a ground of the feedback resistor, and a short-circuit sensor configured to sense a voltage value of a current applied to the feedback resistor or the short-circuit sensing resistor according to whether the switch is switched on or off.

14 Claims, 7 Drawing Sheets

BACKLIGHT DRIVING CIRCUIT AND DISPLAY APPARATUS

CROSS-REFERENCE TO RELATED APPLICATION

This application claims the benefit under 35 U.S.C. §119(a) of Korean Patent Application No. 10-2011-0003913, filed on Jan. 14, 2011, in the Korean Intellectual Property Office, the entire disclosure of which is incorporated herein by reference for all purposes.

BACKGROUND

1. Field

The following description relates to a backlight driving circuit and a display apparatus using the same, and, as an example, to a backlight driving circuit which uses a light-emitting module of a display as a backlight unit (BLU) to display an image, and a display apparatus using the same.

2. Description of the Related Art

A liquid crystal display (LCD) is currently widely used but does not self-emit light. Therefore, a LCD panel includes a backlight unit (BLU) that projects backlight onto the LCD.

The BLU includes a light-emitting unit that generates backlight and a light guide plate that uniformly transmits backlight, which is emitted from a light-emitting module, to a surface of a display panel. The light-emitting unit includes the light-emitting module, the light-emitting module being disposed to efficiently project the backlight onto the LCD. In addition, the light-emitting unit includes a backlight driving circuit that drives the light-emitting module. For example, instead of a conventional cold cathode fluorescent lamp (CCFL), a light-emitting diode (LED), which has high luminance and a long lifespan, attracts attention as a light-emitting device of the BLU.

If a final output terminal or the light-emitting module short-circuits with ground in the backlight driving circuit, parts of the backlight driving circuit may be damaged by an excessive short-circuit current. Therefore, in order to prevent the damage to the parts of the backlight driving circuit, the short-circuit of the backlight driving circuit is to be sensed to control a current flowing in the backlight driving circuit.

As a method of sensing whether the backlight driving circuit has short-circuited, a high side current sensing method is used to connect a short-circuit sensing resistor to an output terminal of a DCDC converter in series and measure a voltage value of the short-circuit sensing resistor. Here, a voltage value of a flowing current is sensed to sense whether the backlight driving circuit has short-circuited, by using a method of sensing the voltage value of the short-circuit sensing resistor and amplifying the sensed voltage value through an amplifier. However, since the voltage value applied to the short-circuit sensing resistor of the output terminal of the DCDC converter is hundreds of volts, an additional high voltage amplifier is required to lower the voltage value.

In other words, since the high side current sensing method uses the DCDC converter, the short-circuit sensing resistor, and the additional high voltage amplifier, additional cost is incurred.

SUMMARY

In one general aspect, there is provided a backlight driving circuit that provides backlight to a display panel of a display apparatus, the backlight driving circuit including a power supply unit configured to supply power, a converter configured to convert a voltage of the supplied power, and output the converted voltage, a light-emitting module supplied with the outputted voltage from the converter, the light-emitting module being configured to provide the backlight, a switch connected to an output terminal of the light-emitting module, the switch being configured to control an operation of the light-emitting module, a feedback resistor connected to an output terminal of the switch, the feedback resistor being configured to sense a voltage of a current flowing in the light-emitting module, a short-circuit sensing resistor connected between a ground of the power supply unit and a ground of the feedback resistor, and a short-circuit sensor configured to sense a voltage value of a current applied to the feedback resistor or the short-circuit sensing resistor according to whether the switch is switched on or off, thereby determining whether the backlight driving circuit is short-circuited.

The general aspect of the backlight driving circuit may further provide that the short-circuit sensor is further configured to sense the voltage value of the current applied to the short-circuit sensing resistor to determine whether the backlight driving circuit is short-circuited if the switch is switched off.

The general aspect of the backlight driving circuit may further provide that the short-circuit sensor is further configured to determine that the backlight driving circuit is short-circuited if the switch is switched off, and the voltage value of the current applied to the short-circuit sensing resistor and sensed by the short-circuit sensor is less than a particular value.

The general aspect of the backlight driving circuit may further provide that the short-circuit sensor is further configured to determine that the backlight driving circuit is short-circuited if the switch is switched off, and the voltage value of the current applied to the short-circuit sensing resistor and sensed by the short-circuit sensor is less than the particular value, and sensed for a preset time.

The general aspect of the backlight driving circuit may further provide that the preset time is 80 msec.

The general aspect of the backlight driving circuit may further provide that the short-circuit sensor is further configured to sense the voltage value of the current applied to the feedback resistor to determine whether the backlight driving circuit is short-circuited if the switch is switched on.

The general aspect of the backlight driving circuit may further provide that the short-circuit sensor is further configured to determine that the backlight driving circuit is short-circuited if the switch is switched on, and the voltage value of the current applied to the feedback resistor and sensed by the short-circuit sensor is less than a particular value.

The general aspect of the backlight driving circuit may further provide that the short-circuit sensor is further configured to determine that the backlight driving circuit is short-circuited if the switch is switched on, and the voltage value of the current applied to the feedback resistor and sensed by the short-circuit sensor is less than the particular value, and sensed for a preset time.

The general aspect of the backlight driving circuit may further provide that the short-circuit sensor is further configured to determine whether the voltage value of the current applied to the feedback resistor and sensed by the short-circuit sensor is less than the particular value only if the preset time is greater than a time for which the switch is switched on, and the switch is switched on when the switch is repeatedly switched on and off.

The general aspect of the backlight driving circuit may further provide that the preset time is 80 msec.

The general aspect of the backlight driving circuit may further provide that the short-circuit sensor includes a first comparator configured to compare the voltage value of the current applied to the feedback resistor with a first reference voltage value, a second comparator configured to compare the voltage value of the current applied to the short-circuit sensing resistor with a second reference voltage value, a mode selector configured to select a mode according to whether the switch is switched on or off, and output a comparison result of one of the first and the second comparators according to the selected mode, a timing counter configured to determine whether the comparison result output from the mode selector is maintained for a preset time, and a signal generator configured to sense whether the backlight driving circuit is short-circuited by using the comparison result of the one of the first and second comparators output from the mode selector selected according to whether the switch is switched on or off, and generate a short-circuit sensing signal configured to protect a device of the backlight driving circuit if it is sensed that the backlight driving circuit is short-circuited.

In another aspect, there is provided a display apparatus, including an image processor configured to process a signal of an input image, a display panel configured to display the image having the processed signal, and a backlight driving circuit configured to provide backlight to the display panel, the backlight driving circuit including a power supply unit configured to supply power, a converter configured to convert a voltage of the supplied power, and output the converted voltage, a light-emitting module supplied with the outputted voltage from the converter, the light-emitting module being configured to provide the backlight, a switch connected to an output terminal of the light-emitting module, the switch being configured to control an operation of the light-emitting module, a feedback resistor connected to an output terminal of the switch, the feedback resistor being configured to sense a voltage of a current flowing in the light-emitting module, a short-circuit sensing resistor connected between a ground of the power supply unit and a ground of the feedback resistor, and a short-circuit sensor configured to sense a voltage value of a current applied to the feedback resistor or the short-circuit sensing resistor according to whether the switch is switched on or off, thereby determining whether the backlight driving circuit is short-circuited.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 1:
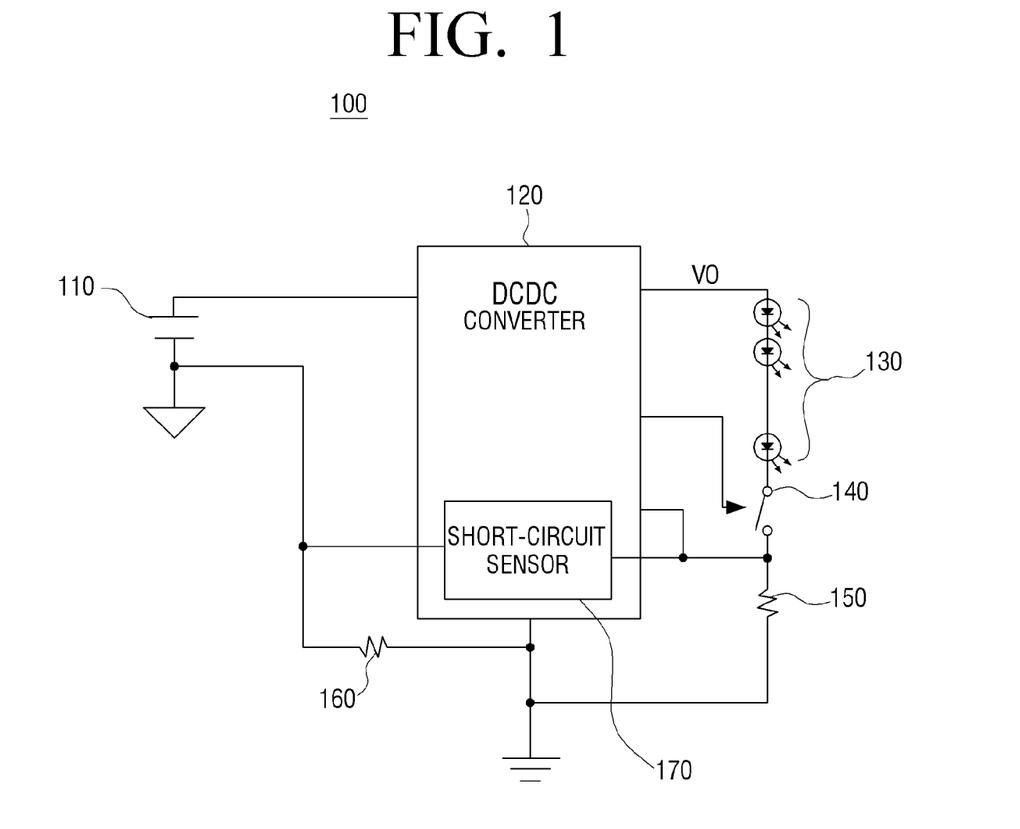
FIG. 1 is a circuit diagram illustrating an example of a backlight driving circuit according to a general aspect.

FIG. 1 is a circuit diagram illustrating an example of a backlight driving circuit 100 according to a general aspect. Referring to FIG. 1, the backlight driving circuit 100 includes a power supply unit 110, a DCDC converter 120, a light-emitting module 130, a switch 140, a feedback resistor 150, a short-circuit sensing resistor 160, and a short-circuit sensor 170.

The power supply unit 110 provides power to the light-emitting module 130 of the backlight driving circuit 100. Here, the power supply unit 110 may provide power as alternating current (AC) power or direct current (DC) power.

The DCDC converter 120 converts a voltage of the power input from the power supply unit 110 and provides the converted voltage to the light-emitting module 130. For example, the DCDC converter 120 converts the voltage applied from the power supply unit 110 into a rated voltage of the light-emitting module 130 in order to drive the light-emitting module 130 at the rated voltage. The general aspect includes a DCDC converter, but is not limited thereto.

An end of the light-emitting module 130 is connected to the DCDC converter 120, and an other end of the light-emitting module 130 is connected to the switch 140. Therefore, the light-emitting module 130 provides backlight by using the power supplied from the power supply unit 110. For example, the light-emitting module 130 dims according to whether the switch 140 is switched on or off. The light-emitting module 130 may be a light-emitting diode (LED) module, but is not limited thereto. For example, the light-emitting module 130 may be any type of light-emitting module capable of supplying backlight. In addition, as shown in FIG. 1, light-emitting devices of the light-emitting module 130 may be connected to one another in series. However, the light-emitting module 130 is not limited to this configuration. For example, the light-emitting devices of the light-emitting module 130 may be connected to one another in parallel.

The switch 140 is connected to the other end of the light-emitting module 130 to control dimming of the light-emitting module 130. For example, the switch 140 controls the dimming of the light-emitting module 130 according to a pulse width modulation (PWM) signal in order to adjust brightness of a screen displayed in a display apparatus.

The feedback resistor 150 is connected to an end of the switch 140 to sense a voltage of a current flowing in the light-emitting module 130. If the switch 140 is switched on, the feedback resistor 150 is used to sense whether the backlight driving circuit 100 is short-circuited.

The short-circuit sensing resistor 160 is connected to a ground GND of the power supply unit 110 and a ground GND of the feedback resistor 150. If the switch 140 is switched off, the short-circuit sensing resistor 160 is used to sense whether the backlight driving circuit 100 is short-circuited.

The short-circuit sensor 170 senses a voltage applied to the feedback resistor 150 or the short-circuit sensing resistor 160 according to whether the switch 140 is switched on or off, in order to sense whether the backlight driving circuit 100 has short-circuited. An example of the short-circuit sensor 170 will now be described with reference to FIG. 2.

Figure 2:
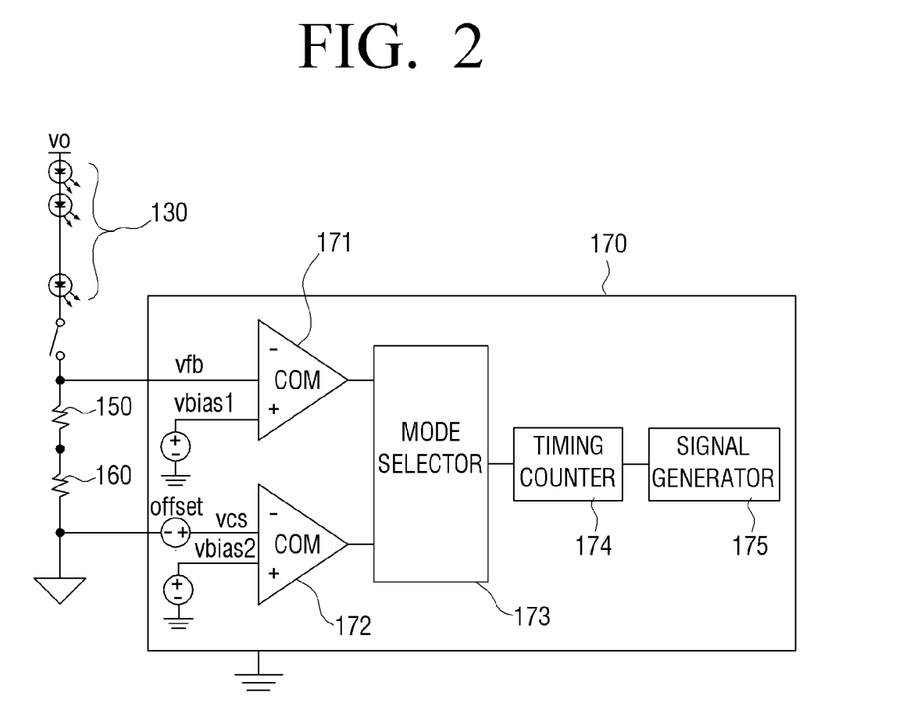
FIG. 2 is a block diagram illustrating an example of a short-circuit sensor 170 of FIG. 1, according to a general aspect.

FIG. 2 is a block diagram illustrating an example of the short-circuit sensor 170 of FIG. 1, according to a general aspect. Referring to FIG. 2, the short-circuit sensor 170 includes a first comparator 171, a second comparator 172, a mode selector 173, a timing counter 174, and a signal generator 175.

The first comparator 171 is connected to an end of the feedback resistor 150 to compare a voltage value vfb of a current applied to the feedback resistor 150 with a first reference voltage value vbias1.

The second comparator 172 is connected to an end of the short-circuit sensing resistor 160 to compare a voltage value vcs of a current applied to the short-circuit sensing resistor 160 with a second reference voltage value vbias2.

The mode selector 173 selects a mode according to whether the switch 140, displayed in FIG. 1, is switched on or off. For example, if the switch 140 of FIG. 1 is switched off, the mode selector 173 is connected to the second comparator 172 to output a result of the comparison between the voltage value vcs of the current applied to the short-circuit sensing resistor 160 and the second reference voltage value vbias2 to the timing counter 174. If the switch 140 of FIG. 1 is switched on, the mode selector 173 is connected to the first comparator 171 to output a result of the comparison between the voltage value vfb of the current applied to the feedback resistor 150 and the first reference voltage value vbias1 to the timing counter 174.

The timing counter 174 counters a timing for which the comparison result output from the mode selector 174 is maintained for a preset time (e.g., 80 msec) or more.

The signal generator 175 senses whether the backlight driving circuit 100 is short-circuited by using the comparison results output from the first and second comparators 171 and 172 which are selected according to whether the switch 140 of FIG. 1 is switched on or off by the mode selector 173. If the signal generator 175 senses that the backlight driving circuit 100 is short-circuited, the signal generator 175 generates a short-circuit sensing signal configured to protect a device of the backlight driving circuit 100.

For example, if the switch 140 of FIG. 1 is switched off, and the voltage value vcs of the current applied to the short-circuit sensing resistor 160 is lower than the second reference voltage value vbias2 for a preset time, the signal generator 175 senses that the backlight driving circuit 100 has short-circuited and generates the short-circuit sensing signal. If the switch 140 of FIG. 1 is switched on, and the voltage value vfb of the current applied to the feedback resistor 150 is lower than the first reference voltage value vbias1 for a preset time, the signal generator 175 senses that the backlight driving circuit 100 has short-circuited and generates the short-circuit sensing signal.

Further, if the preset time is longer than a time that the switch 140 of FIG. 1 is switched on, the signal generator 175 adds up only times when the switch 140 of FIG. 1 is switched on to sense whether the added time has reached the preset time. For example, if the switch 140 of FIG. 1 is repeatedly switched on and off due to a dimming operation of the switch 140 of FIG. 1, and the voltage value vfb of the current applied to the feedback resistor 150 is lower than the first reference voltage value vbias1 for the preset time when the switch 140 of FIG. 1 is first switched on, the signal generator 175 holds a time that the switch 140 of FIG. 1 is first switched on. In addition, if the switch 140 of FIG. 1 is first switched off, the signal generator 175 does not add up times when the switch 140 of FIG. 1 is switched off. If the voltage value vfb of the current applied to the feedback resistor 150 is lower than the first reference voltage value vbias1 for the preset time when the switch 140 of FIG. 1 is secondly switched on, the signal generator 175 adds a time when the switch 140 of FIG. 1 is secondly switched on to the time when the switch 140 of FIG. 1 is first switched on. If the added time has reached the preset time, the signal generator 175 determines that the backlight driving circuit 100 is short-circuited and generates the short-circuit sensing signal. If the added time has not reached the preset time, the signal generator 175 sums times when the switch 140 of FIG. 1 has been switched on if the voltage value vfb of the current applied to the feedback resistor 150 is lower than the first reference voltage value vbias1 until the added time reaches the preset time.

Examples of methods of sensing whether the backlight driving circuit 100 is short-circuited according to whether the switch 140 of FIG. 1 is switched on or off will now be described with reference to FIGS. 3 through 7.

Figure 3:
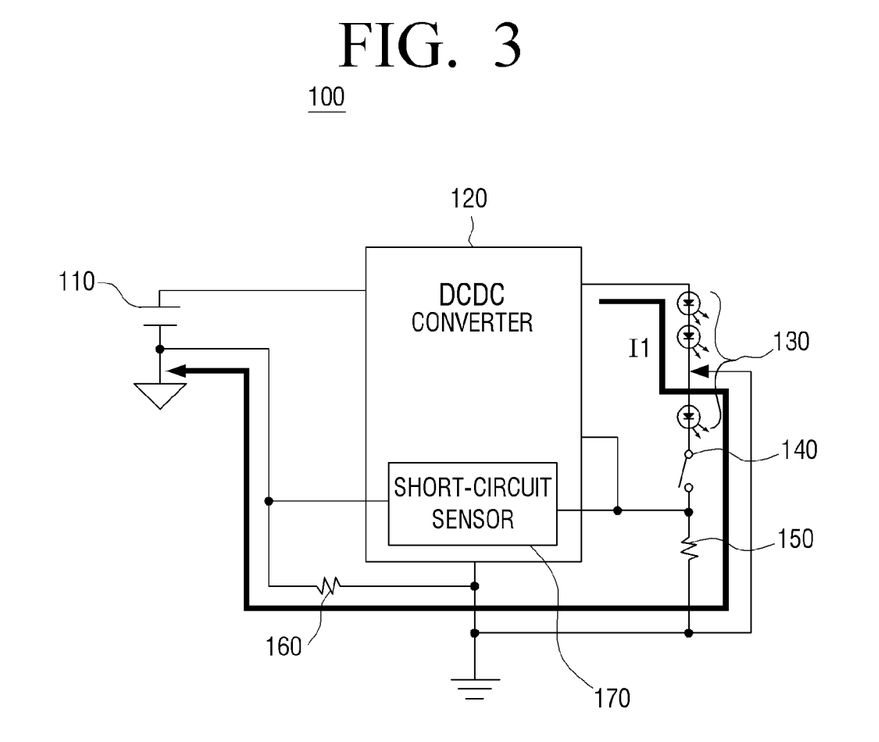
FIG. 3 is a view illustrating an example of a method of sensing whether a backlight driving circuit is short-circuited if a switch is switched off, according to a general aspect.

FIG. 3 is a view illustrating an example of a method of sensing whether the backlight driving circuit 100 is short-circuited if the switch 140 is switched off, according to a general aspect. As shown in FIG. 3, if the switch 140 is switched off, a current I1 flowing in the backing driving circuit 100 does not flow in the light-emitting module 130, the switch 140, and the feedback resistor 150 but flows in the short-circuit sensor resistor 160 which is connected between the ground of the power supply unit 110 and the ground of the feedback resistor 150. Therefore, if the switch 140 is switched off, the short-circuit sensing resistor 160 is used to sense whether the backlight driving circuit 100 is short-circuited. For example, if the backlight driving circuit 100 is not short-circuited, the voltage value vcs of the current flowing in the short-circuit sensing resistor 160 is higher than the second reference voltage value vbias2. However, if the backlight driving circuit 100 is short-circuited, the voltage value vcs of the current flowing in the short-circuit sensing resistor 160 is lower than the second reference voltage value vbias2.

Figure 4:
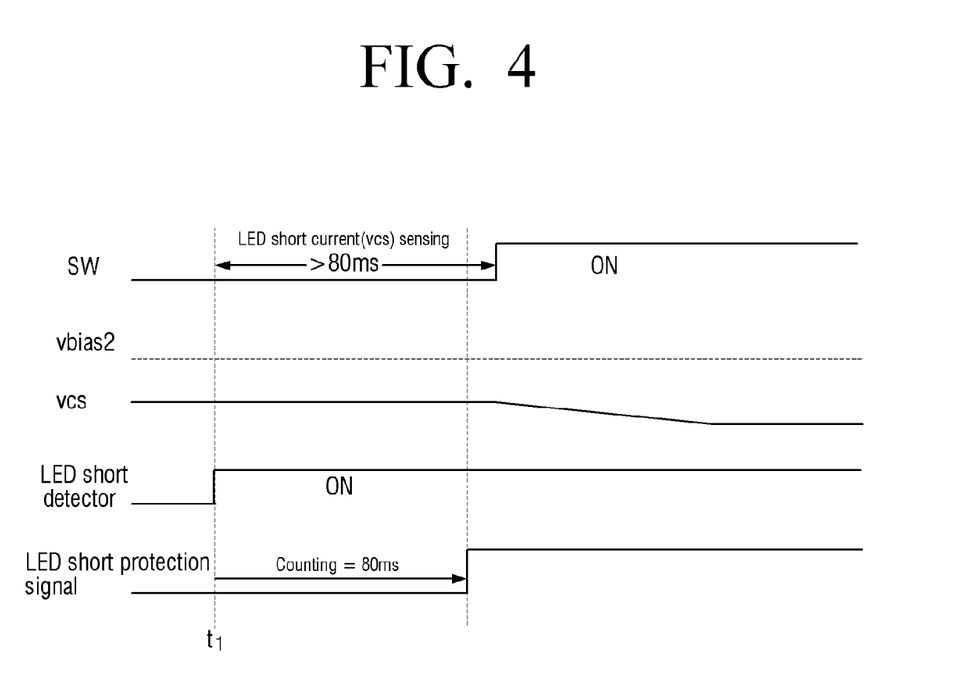
FIG. 4 is a timing diagram illustrating an example of a method of generating a short-circuit sensing signal if the switch is switched off, according to a general aspect.

As shown in FIG. 4, if the voltage value vcs is lower than the second reference voltage vbias2 at a particular time $t_1$ when the switch 140 of FIG. 3 is switched off, the short-circuit sensor 170 starts to sense that the backlight driving circuit 100 is short-circuited. If the voltage value vcs is lower than the second reference voltage value vbias2 for a preset time (e.g., 80 ms), as shown in FIG. 4, the short-circuit sensor 170 generates a short-circuit sensing signal.

Figure 5:
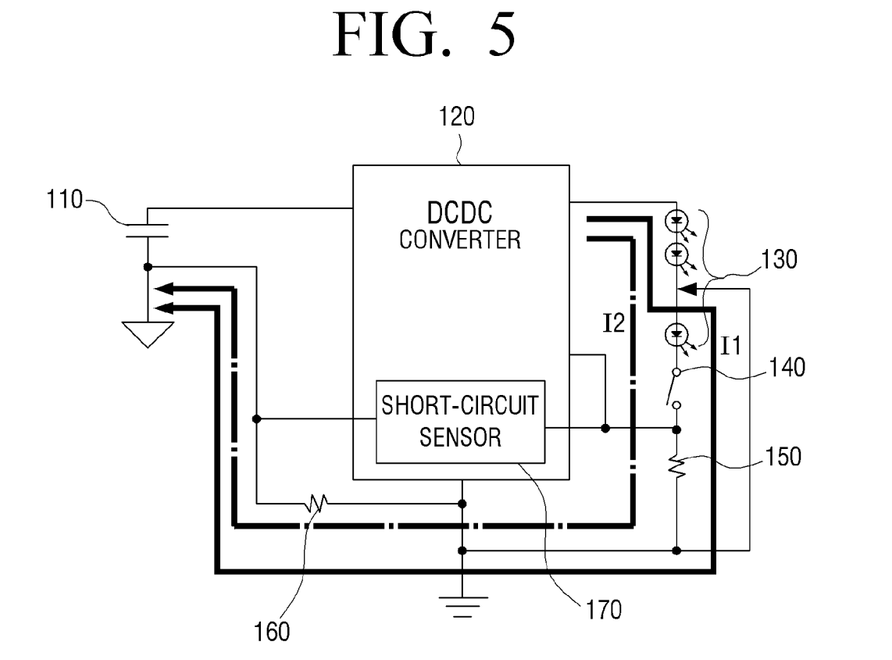
FIG. 5 is a view illustrating an example of a method of sensing whether the backlight driving circuit is short-circuited if the switch is switched on, according to a general aspect.

FIG. 5 is a view illustrating an example of a method of sensing whether the backlight driving circuit 100 is short-circuited if the switch 140 is switched on, according to a general aspect.

As shown in FIG. 5, if the switch 140 is switched on, a current I2 flowing in the backlight driving circuit 100 flows in the light-emitting module 130, the switch 140, the feedback resistor 150, and the short-circuit sensing resistor 160. Here, if the switch 140 is switched on, the feedback resistor 150 is used to sense whether the backlight driving circuit 100 has short-circuited. For example, if the backlight driving circuit 100 is not short-circuited, the voltage value vfb of the current flowing in the feedback resistor 160 is higher than the first reference voltage value vbias1, which is the rated voltage of the light-emitting module 130. However, if the backlight driving circuit 100 is short-circuited, the voltage value vfb of the current flowing in the feedback resistor 150 rapidly becomes lower than the first reference voltage value vbias1. For example, the voltage value vfb of the current flowing in the feedback resistor 150 is lower than the first reference voltage value vbias1.

Figure 6:
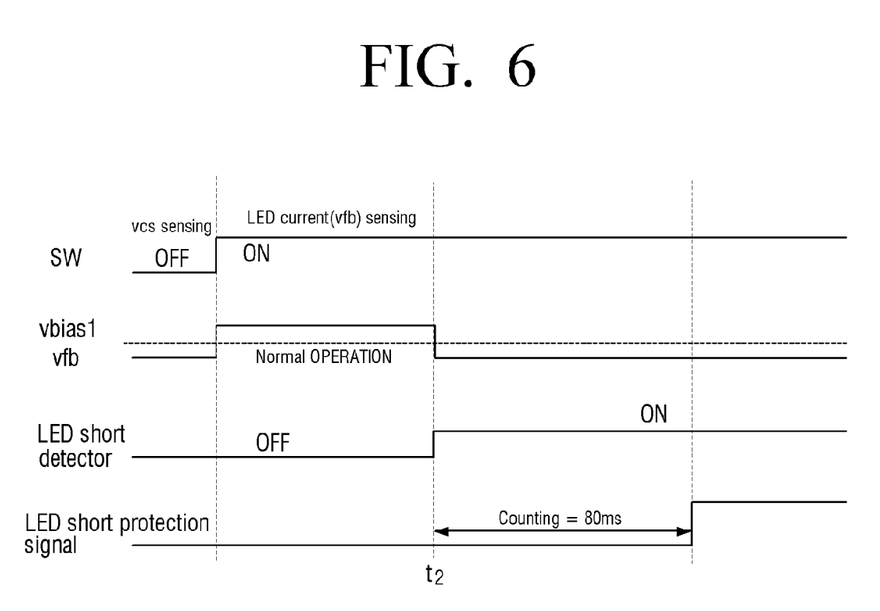
FIG. 6 is a timing diagram illustrating an example of a method of generating a short-circuit sensing signal if the switch is switched on, according to a general aspect.

Therefore, as shown in FIG. 6, if the voltage value vfb is lower than the first reference voltage value vbias1 at a particular time $t_2$ when the switch 140 of FIG. 5 is switched on, the short-circuit sensor 170 starts to sense that the backlight driving circuit 100 is short-circuited as shown in FIG. 6. If the voltage value vfb is lower than the first reference voltage value vbias1 for a preset time (e.g., 80 ms) as shown in FIG. 6, the short-circuit sensor 170 generates a short-circuit sensing signal.

Figure 7:
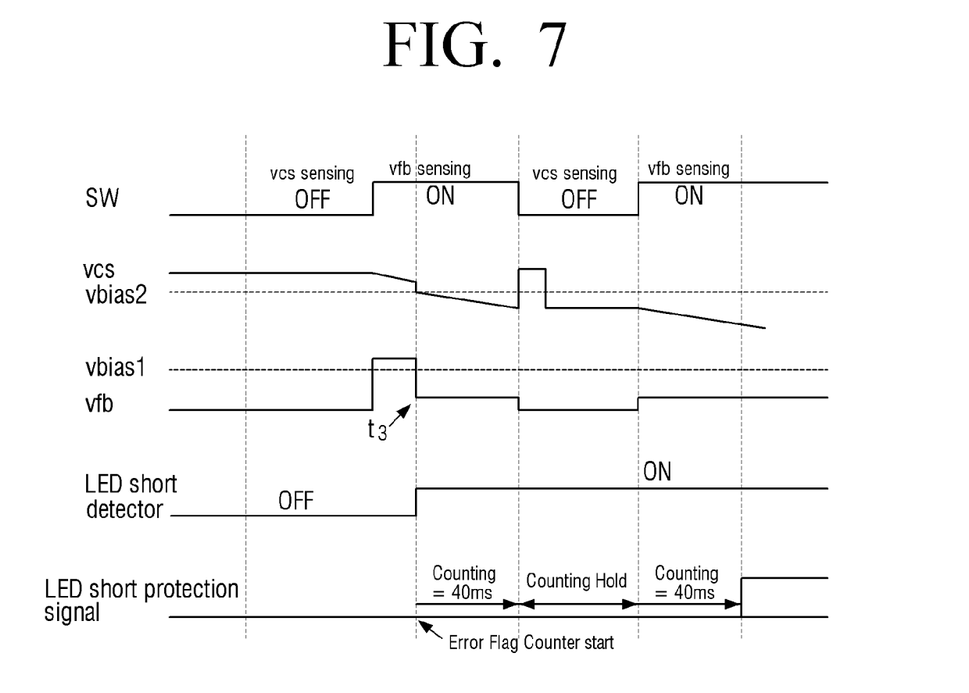
FIG. 7 is a timing diagram illustrating an example of a method of generating a short-circuit sensing signal if the switch is repeatedly switched on and off, according to a general aspect.

FIG. 7 is a timing diagram illustrating an example of a method of generating a short-circuit sensing signal if the switch 140 of FIG. 1 is repeatedly switched on and off, according to a general aspect.

As shown in FIG. 7, the switch 140 of FIG. 1 is repeatedly switched on and off. Here, if the switch 140 of FIG. 1 is switched on due to the dimming operation thereof, although the switch 140 of FIG. 1 is switched off again, the voltage value vfb of the feedback resistor 150 is used to sense whether the backlight driving circuit 100 is short-circuited. In other words, if the switch 140 of FIG. 1 is repeatedly switched on and off, the voltage value vfb of the feedback resistor 150 is measured to sense whether the backlight driving circuit 100 is short-circuited only if the switch 140 of FIG. 1 is switched on.

If the voltage value vfb of the feedback resistor 150 rapidly becomes lower than the first reference voltage value vbias1 at a particular time $t_3$ when the switch 140 of FIG. 1 is switched on as shown in FIG. 7, the short-circuit sensor 170 starts to sense that the backlight driving circuit 100 is short-circuited as is shown in FIG. 7. The short-circuit sensor 170 counts a time for which the switch 140 of FIG. 1 is switched on. If the switch 140 of FIG. 1 is switched off again, the short-circuit sensor 170 does not count an additional time although the voltage value vcs of the short-circuit sensing resistor 160 is lower than the second reference voltage value vbias2. If the switch 140 of FIG. 1 is switched on again, and the voltage value vfb of the feedback resistor 150 is lower than the first reference voltage value vbias1, the short-circuit sensor 170 re-counts a time and added the re-counted time to a time when the switch 140 of FIG. 1 is first switched on in order to calculate a time. If the calculated time reaches a preset time, the short-circuit sensor 170 generates a short-circuit sensing signal as shown in FIG. 7.

According to teachings above, if it is sensed that a backlight driving circuit is short-circuited, one short-circuit sensing resistor is added between a ground of a power supply unit and a ground of a feedback resistor in order to determine whether the backlight driving circuit is short-circuited. Therefore, an additional high voltage amplifier is not required.

According to teachings above, a backlight driving circuit has been provided that may be applied to a display apparatus including the backlight driving circuit. For example, a display apparatus according to a general aspect may include an image processor that signal-processes an input image; a display panel that displays the signal-processed image; and a backlight driving circuit that provides backlight to the display panel. The backlight driving circuit may be realized as a backlight driving circuit as described above.

Further, according to teachings above, a backlight driving circuit is provided that may sense a voltage applied to a feedback resistor or a short-circuit sensing resistor in order to determine whether the backlight driving circuit has short-circuited, where the feedback resistor is connected to an output terminal of a switch to sense a voltage applied to a light-emitting module according to whether the switch is switched on/off, and the short-circuit sensing resistor is connected to ground of a power supply unit and common ground of the feedback resistor and a DCDC converter, and a display apparatus using the backlight driving circuit.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A backlight driving circuit that provides backlight to a display panel of a display apparatus, the backlight driving circuit comprising:
    a power supply unit configured to supply power;
    a converter configured to:
        convert a voltage of the supplied power; and
        output the converted voltage;
    a light-emitting module supplied with the outputted voltage from the converter, the light-emitting module being configured to provide the backlight;
    a switch connected to an output terminal of the light-emitting module, the switch being configured to control an operation of the light-emitting module;
    a feedback resistor connected to an output terminal of the switch, the feedback resistor being configured to sense a voltage of a current flowing in the light-emitting module;
    a short-circuit sensing resistor connected between a ground of the power supply unit and a ground of the feedback resistor; and
    a short-circuit sensor configured to sense a voltage value of a current applied to the feedback resistor or the short-circuit sensing resistor according to whether the switch is switched on or off, thereby determining whether the backlight driving circuit is short-circuited.

2. The backlight driving circuit as claimed in claim 1, wherein the short-circuit sensor is further configured to sense the voltage value of the current applied to the short-circuit sensing resistor to determine whether the backlight driving circuit is short-circuited if the switch is switched off.

3. The backlight driving circuit as claimed in claim 2, wherein the short-circuit sensor is further configured to determine that the backlight driving circuit is short-circuited if:
    the switch is switched off; and
    the voltage value of the current applied to the short-circuit sensing resistor and sensed by the short-circuit sensor is less than a particular value.

4. The backlight driving circuit as claimed in claim 3, wherein the short-circuit sensor is further configured to determine that the backlight driving circuit is short-circuited if:
    the switch is switched off; and
    the voltage value of the current applied to the short-circuit sensing resistor and sensed by the short-circuit sensor is:
        less than the particular value; and
        sensed for a preset time.

5. The backlight driving circuit as claimed in claim 4, wherein the preset time is 80 msec.

6. The backlight driving circuit as claimed in claim 1, wherein the short-circuit sensor is further configured to sense the voltage value of the current applied to the feedback resistor to determine whether the backlight driving circuit is short-circuited if the switch is switched on.

7. The backlight driving circuit as claimed in claim 6, wherein the short-circuit sensor is further configured to determine that the backlight driving circuit is short-circuited if:
   the switch is switched on; and
   the voltage value of the current applied to the feedback resistor and sensed by the short-circuit sensor is less than a particular value.

8. The backlight driving circuit as claimed in claim 7, wherein the short-circuit sensor is further configured to determine that the backlight driving circuit is short-circuited if:
   the switch is switched on; and
   the voltage value of the current applied to the feedback resistor and sensed by the short-circuit sensor is:
     less than the particular value; and
     sensed for a preset time.

9. The backlight driving circuit as claimed in claim 8, wherein the short-circuit sensor is further configured to determine whether the voltage value of the current applied to the feedback resistor and sensed by the short-circuit sensor is less than the particular value only if:
   the preset time is greater than a time for which the switch is switched on; and
   the switch is switched on when the switch is repeatedly switched on and off.

10. The backlight driving circuit as claimed in claim 8, wherein the preset time is 80 msec.

11. The backlight driving circuit as claimed in claim 1, wherein the short-circuit sensor comprises:
   a first comparator configured to compare the voltage value of the current applied to the feedback resistor with a first reference voltage value;
   a second comparator configured to compare the voltage value of the current applied to the short-circuit sensing resistor with a second reference voltage value;
   a mode selector configured to:
     select a mode according to whether the switch is switched on or off; and
     output a comparison result of one of the first and the second comparators according to the selected mode;
   a timing counter configured to determine whether the comparison result output from the mode selector is maintained for a preset time; and
   a signal generator configured to:
     sense whether the backlight driving circuit is short-circuited by using the comparison result of the one of the first and second comparators output from the mode selector selected according to whether the switch is switched on or off; and
     generate a short-circuit sensing signal configured to protect a device of the backlight driving circuit if it is sensed that the backlight driving circuit is short-circuited.

12. The backlight driving circuit as claimed in claim 1, wherein the short-circuit sensing resistor senses whether the backlight driving circuit is short-circuited in response to the switch being turned off.

13. The backlight driving circuit as claimed in claim 1, wherein the feedback resistor senses whether the backlight driving circuit is short-circuited in response to the switch being turn on.

14. A display apparatus, comprising:
   an image processor configured to process a signal of an input image;
   a display panel configured to display the image having the processed signal; and
   a backlight driving circuit configured to provide backlight to the display panel, the backlight driving circuit comprising:
     a power supply unit configured to supply power;
   a converter configured to:
     convert a voltage of the supplied power; and
     output the converted voltage;
   a light-emitting module supplied with the outputted voltage from the converter, the light-emitting module being configured to provide the backlight;
   a switch connected to an output terminal of the light-emitting module, the switch being configured to control an operation of the light-emitting module;
   a feedback resistor connected to an output terminal of the switch, the feedback resistor being configured to sense a voltage of a current flowing in the light-emitting module;
   a short-circuit sensing resistor connected between a ground of the power supply unit and a ground of the feedback resistor; and
   a short-circuit sensor configured to sense a voltage value of a current applied to the feedback resistor or the short-circuit sensing resistor according to whether the switch is switched on or off, thereby determining whether the backlight driving circuit is short-circuited.

\* \* \* \* \*